(12) United States Patent
Drew

(10) Patent No.: US 9,939,964 B2
(45) Date of Patent: Apr. 10, 2018

(54) FREQUENCY SWITCHING

(75) Inventor: Colin Drew, Dundee (GB)

(73) Assignee: NCR Corporation, Atlanta, GA (US)

(*) Notice: Subject to any disclaimer, the term of this patent is extended or adjusted under 35 U.S.C. 154(b) by 60 days.

(21) Appl. No.: 13/402,981

(22) Filed: Feb. 23, 2012

(65) Prior Publication Data

US 2013/0222322 A1   Aug. 29, 2013

(51) Int. Cl.
*G06F 3/045* (2006.01)
*G06F 3/041* (2006.01)
*G06F 3/044* (2006.01)

(52) U.S. Cl.
CPC ............ *G06F 3/044* (2013.01); *G06F 3/0418* (2013.01)

(58) Field of Classification Search
CPC ....... G06F 3/044; G06F 3/0416; G06F 3/0418
See application file for complete search history.

(56) References Cited

U.S. PATENT DOCUMENTS

| | | | |
|---|---|---|---|
| 2008/0162996 A1* | 7/2008 | Krah et al. | 714/27 |
| 2009/0322351 A1* | 12/2009 | McLeod | 324/658 |
| 2011/0063993 A1* | 3/2011 | Wilson | G06F 3/044 370/254 |
| 2011/0096011 A1* | 4/2011 | Suzuki | 345/173 |
| 2011/0157077 A1* | 6/2011 | Martin et al. | 345/174 |
| 2012/0268415 A1* | 10/2012 | Konovalov | G06F 3/044 345/174 |

* cited by examiner

*Primary Examiner* — Nan-Ying Yang
(74) *Attorney, Agent, or Firm* — Schwegman, Lundberg & Woessner

(57) ABSTRACT

A method and apparatus are disclosed for providing a scan signal to a plurality of electrode elements of a touchscreen display. The apparatus includes a capacitive sensing module that selectively provides a scan signal at a selected one of a plurality of possible scan frequencies, a noise detection module that determines if a noise a level at the selected one scan frequency satisfies a pre-determined condition and the sensing module provides the scan signal at a further one of the possible scan frequencies if the noise level satisfies the pre-determined condition.

9 Claims, 3 Drawing Sheets

FREQUENCY SWITCHING

FIELD OF THE INVENTION

The present invention relates to improvements in or relating to a touchscreen module. In particular, but not exclusively, the present invention relates to a method and apparatus for providing a scan signal, having a switchable scan frequency, to at least the drive lines of a projected capacitive touchscreen system.

BACKGROUND OF THE INVENTION

Touchscreen modules comprise touch sensitive panels superimposed over a display, so that a user can select an object (for example, text or graphics) presented on the display by touching the corresponding point on the touch sensitive panel. A touch panel controller ascertains co-ordinates of a point touched by the user and provides the co-ordinates of this point to an operating system.

A touchscreen module can be based on any one of a variety of different technologies, such as resistive, capacitive, surface acoustic wave, and the like. Capacitive sensing is becoming more prevalent and in demand for applications and there are a number of methods to measure capacitance. Some example methods are relaxation oscillator, charge time versus voltage, voltage divider, charge transfer and sigma-delta modulation. Typically, a capacitive sensing module (CSM) is utilized which produces an oscillating voltage signal, referred to as a scan signal, for measurement at a frequency dependent upon the capacitance of an object connected to the module. Typically, the CSM oscillates at a particular frequency dependent upon the capacitance of connected sensing electrodes. The CSM frequency changes when a touch is introduced near a sensing electrode because the touch introduces and changes a total capacitance presented by an electrode. The CSM frequency change is used as an indication of a touch condition.

A problem with touchscreen operation is that for compliance with regulations in Europe and other countries, a touchscreen must successfully operate when noise is injected into a system across a defined frequency range. On occasion, if a touchscreen scan signal has a scan frequency that falls within this range then the noise injected will interfere with the touchscreen operation. This may be seen as false touches and/or failure to recognize a true touch on the screen. This can lead to device failure being indicated.

In addition, in a non-testing situation, touchscreens are generally susceptible to noise interference from the surrounding environment, for example if a device is used near a transmitter. Again, if an environmental noise is introduced which is at or around a particular scan frequency utilized by a touchscreen controller, then false positives and/or device failure can occur.

Prior known systems utilize ferrites to attenuate any external noise as it enters the system. However, this can be very difficult to achieve when the conducted noise is present on the mains ground.

Prior known systems are also known that disable the touchscreen when noise is detected at a level which would interfere with operation of the device. Dis-activation of the touchscreen unfortunately often provides a disagreeable user experience.

SUMMARY OF THE INVENTION

It is an aim of the present invention to at least partly mitigate the above-mentioned problems.

It is an aim of certain embodiments of the present invention to provide a method and apparatus for providing a scan signal to conductive elements of a touchscreen display panel whereby during a test phase or a non-test phase, when noise is intentionally or non-intentionally injected respectively the touchscreen controller will remain fully operational without risk of error.

It is an aim of certain embodiments of the present invention to provide a touchscreen controller usable in conjunction with a touchscreen of a broad range of user devices and/or user terminals and which remains fully and correctly operational when environmental noise and/or test noise is introduced.

It is an aim of certain embodiments of the present invention to provide a method and apparatus for switching a scan frequency utilized by a touchscreen controller so that a scan frequency utilized to sense touches on a touchscreen is switched to a new position within the frequency spectrum wholly or at least partially outside of the influence of the noise.

It is an aim of certain embodiments of the present invention to provide a touchscreen controller module able to provide multiple selectable scan frequencies which may be readily switched to avoid, wholly or at least partially, noise within a particular frequency range.

According to a first aspect of the present invention there is provided apparatus for providing a scan signal to a plurality of electrode elements of a touch panel, comprising:
  a capacitive sensing module that selectively provides a scan signal at a selected one of a plurality of possible scan frequencies; and
  a noise detection module that determines if a noise level at the selected one scan frequency satisfies a pre-determined condition; wherein
  the sensing module provides the scan signal at a further one of the possible scan frequencies if the noise level satisfies the pre-determined condition.

Aptly, the sensing module comprises oscillator circuitry that generates an oscillating scan signal at a fundamental frequency.

Aptly, the apparatus further includes a plurality of resistor and/or capacitor elements that are each selectively connectable to the oscillator circuitry to provide a respective signal having a respective scan frequency.

Aptly, the oscillating scan signal is a square wave signal.

Aptly, the apparatus further includes a touch panel comprising a plurality of conductive elements and multiplexer circuitry that selectively connects the scan signal to the conductive elements in a pre-determined order.

Aptly, the noise detection module determines if more than a pre-determined number of touch instances are indicated to thereby indicate that a further scan frequency is to be selected.

According to a second aspect of the present invention there is provided an automated teller machine (ATM) comprising apparatus for providing a scan signal to a plurality of electrode elements of a touch panel in which the apparatus comprises: a capacitive sensing module that selectively provides a scan signal at a selected one of a plurality of possible scan frequencies; and
  a noise detection module that determines if a noise level at the selected one scan frequency satisfies a pre-determined condition; wherein
  the sensing module provides the scan signal at a further one of the possible scan frequencies if the noise level satisfies the pre-determined condition.

According to a third aspect of the present invention there is provided a method of providing a scan signal to a plurality of electrode elements of a touch panel, comprising:

providing a scan signal at a selected one of a plurality of possible scan frequencies to a plurality of electrode elements of a touch panel, determining if a noise level at the selected one scan frequency satisfies a pre-determined condition; and providing a scan signal at a further one of the possible scan frequencies to the plurality of electrode elements if the detected noise level satisfies a pre-determined condition.

Aptly, the method further comprises determining a number of touch instances on the touch panel; and if said a number is greater than a pre-determined number, determining that the noise level satisfies a pre-determined condition.

Aptly, the method further comprises determining a touch instance by determining a change in period of a detected signal of a plurality of the electrode elements in a region of the touch panel.

Aptly, the method further comprises generating a scan signal having a fundamental frequency.

Aptly, the method further comprises selectively connecting an RC component to oscillator circuitry to vary the fundamental frequency of the scan signal.

Aptly, the method further comprises selectively connecting the scan signal to the electrode element in a pre-determined order.

Aptly, the method further comprises switching to said further one of the possible scan frequencies during a test mode of operation when an applied noise signal has a frequency that generates noise substantially at said selected one frequency.

According to a fourth aspect of the present invention, there is provided a method of operating a touch panel, comprising the steps of switching a scan frequency of a scan signal applied to conductive elements of the touch panel to a new frequency when a noise level, at said a scan frequency, is detected that is greater than a pre-determined threshold value.

Aptly, certain embodiments of the present invention generally provide methods, systems, apparatus and software for selecting a scan frequency of a touchscreen controller. The controller may be utilized to drive and control operation of a touchscreen of a broad range of devices such as, but not limited to, mobile telephones, PDAs, smartphones, self-service terminals, ATMs, kiosks, check-in and/or check-out terminals, gaming terminals or the like.

According to a fifth aspect there is provided a touchscreen module comprising:

a display for presenting information to a user of the touchscreen module;

a touch panel mounted in overlapping relationship with the display;

a touch panel controller coupled to the touch panel for detecting a point on the touch panel touched by the user;

According to a sixth aspect there is provided a terminal including a touchscreen module according to the fifth aspect.

Aptly, the terminal is a self-service terminal. The self-service terminal may optionally be an automated teller machine (ATM), an information kiosk, a financial services centre, a bill payment kiosk, a lottery kiosk, a postal services machine, a check-in and/or check-out terminal such as those used in the retail, hotel, car rental, gaming, healthcare, and airline industries, and the like.

Aptly, the terminal includes a platform incorporating an operating system. Aptly, the terminal includes an application that communicates with one or more drivers for a display adapter (also referred to as a graphics card) and/or display to request information from, and write information to, the second memory portion.

Certain embodiments of the present invention provide the advantage that under test conditions when noise is intentionally introduced into a touchscreen controller the touchscreen controller can select a scan frequency away from the frequency range of the injected noise so that the touchscreen controller remains fully operational.

Certain embodiments of the present invention provide the advantage that a touchscreen controller can switch a scan frequency away from a frequency range of environmental noise whereby the touchscreen controller remains fully operational.

Certain embodiments of the present invention provide much greater noise immunity than that offered by prior known systems. This allows projected capacitive touchscreens to meet Regulatory requirements such as the current Radiated and Conducted Immunity Regulations for the European Market.

Certain embodiments of the present invention allow a touchscreen controller to move a scan frequency away from a local noise frequency and maintain system performance even when noise is present on the mains ground.

Certain embodiments enable a scan frequency to be changed to a frequency out with the influence of noise frequency. This allows a device incorporating a touchscreen to remain operational when noise is detected.

BRIEF DESCRIPTION OF THE DRAWINGS

Embodiments of the present invention will now be described hereinafter, by way of example only, with reference to the accompanying drawings in which.

DETAILED DESCRIPTION

Figure 1:
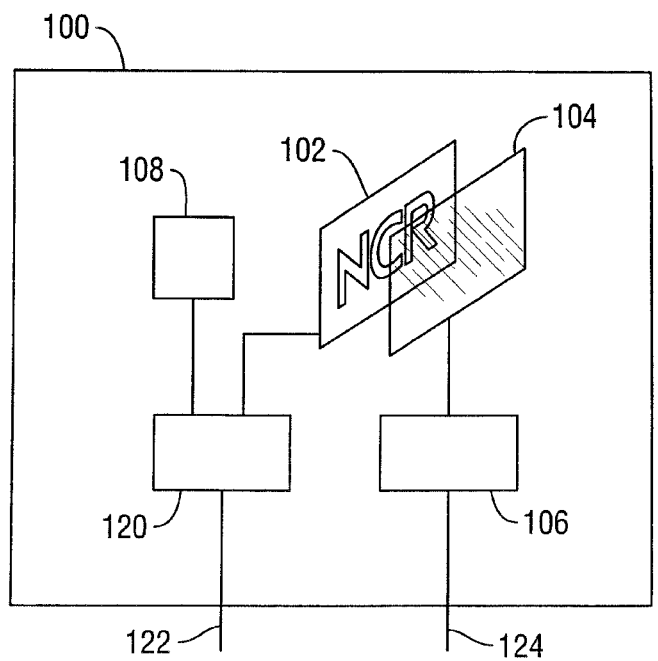
FIG. 1 is a schematic diagram of a touchscreen module according to one embodiment of the present invention.

In the drawings like reference numerals refer to like parts.

Reference is first made to FIG. 1, which is a schematic diagram of a touchscreen module 100 according to one embodiment of the present invention. The touchscreen module 100 comprises: a display 102, a transparent touch panel 104 mounted in overlapping relationship with the display 102 so that the touch panel 104 is in registration with the display 102, a touch panel controller 106 in communication with the touch panel 104, and a serial EEPROM (electrically erasable programmable read only memory) 108 associated with the display 102.

The EEPROM 108 and the display 102 are both coupled to a graphics port (in the form of a VGA or DVI compatible interface) 120. This enables a software application to send data and instructions to both the display 102 and the EEPROM 108 via a conventional VGA or DVI cable 122. The touch panel controller 106 is separate from the display 102 and EEPROM 108 and is coupled to a terminal (not shown in FIG. 1) by a data bus (in the form of a USB connection) 124.

Figure 2:
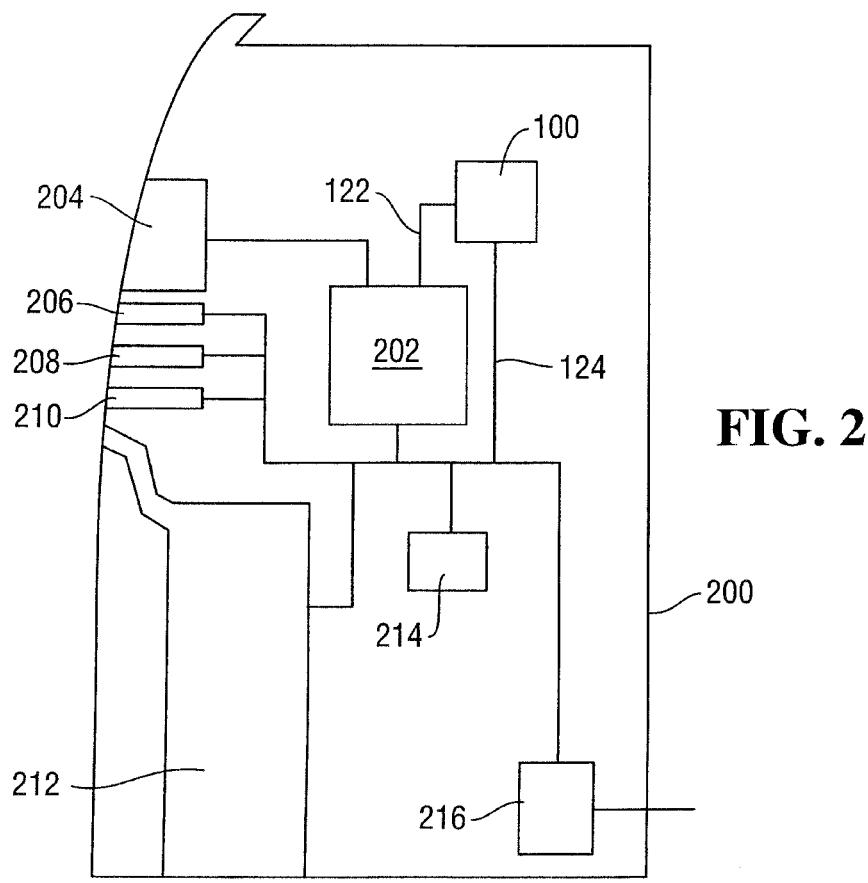
FIG. 2 is a schematic diagram of the touchscreen module of FIG. 1 mounted in a terminal.

Reference will now also be made to FIG. 2, which is a schematic diagram of the touchscreen module 100 mounted in a terminal 200 (in the form of an ATM). It will be appreciated that embodiments of the present invention are not restricted to use in an ATM or even in a self-service type terminal. The ATM 200 comprises a plurality of modules for enabling transactions to be executed and recorded by the ATM 200. These ATM modules comprise: a controller module 202, a customer display 204, a card reader/writer module 206, an encrypting keypad module 208, a receipt printer module 210, a cash dispenser module 212, a journal printer module 214 for creating a record of every transaction executed by the ATM 200, a network connection module 216 for accessing a remote authorization system (not shown), and the touchscreen module 100 for use by a service operator (such as a field engineer, a replenisher, or the like).

Figure 3:
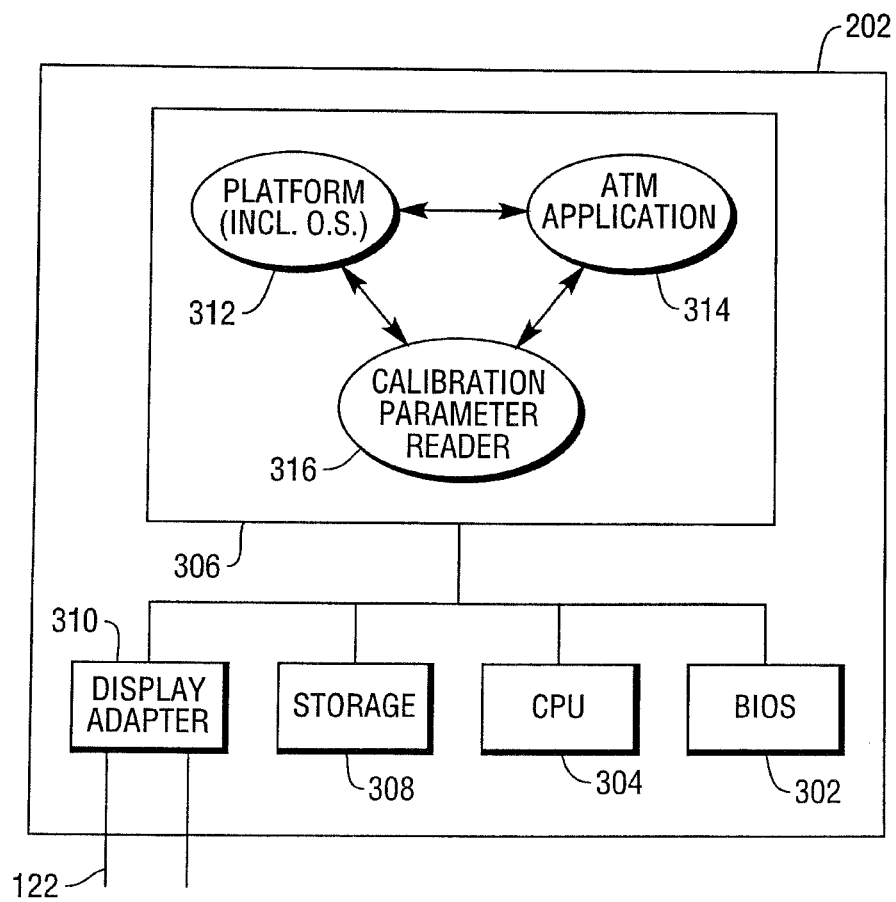
FIG. 3 is a simplified schematic diagram of a controller module for the terminal of FIG. 2.

Reference will now also be made to FIG. 3, which is a simplified schematic diagram of the controller module 202 of the ATM 200. The controller module 202 comprises a BIOS 302 stored in non-volatile memory (different to the EEPROM 108), a microprocessor 304, associated main memory 306, storage space 308 in the form of a magnetic disk drive, and a display controller 310 in the form of a graphics card. The graphics card 310 controls the display 102 in the touchscreen module 100 and also the customer display 204.

In use, the main memory 306 is loaded with a platform 312 (including an ATM operating system kernel and drivers for the modules in the ATM), and an ATM application 314. As is well known in the art, the operating system kernel is responsible for memory, process, task, and disk management.

The ATM application 314 is responsible for controlling the operation of the ATM 200. In particular, the ATM application 200 provides the sequence of screens used in each transaction (referred to as the transaction flow); monitors the condition of each module within the ATM (state of health monitoring); and obtains authorization for transactions from a remote transaction authorization system (not shown). In addition, the main memory 306 is also loaded with a calibration parameter reader routine 316.

Figure 4:
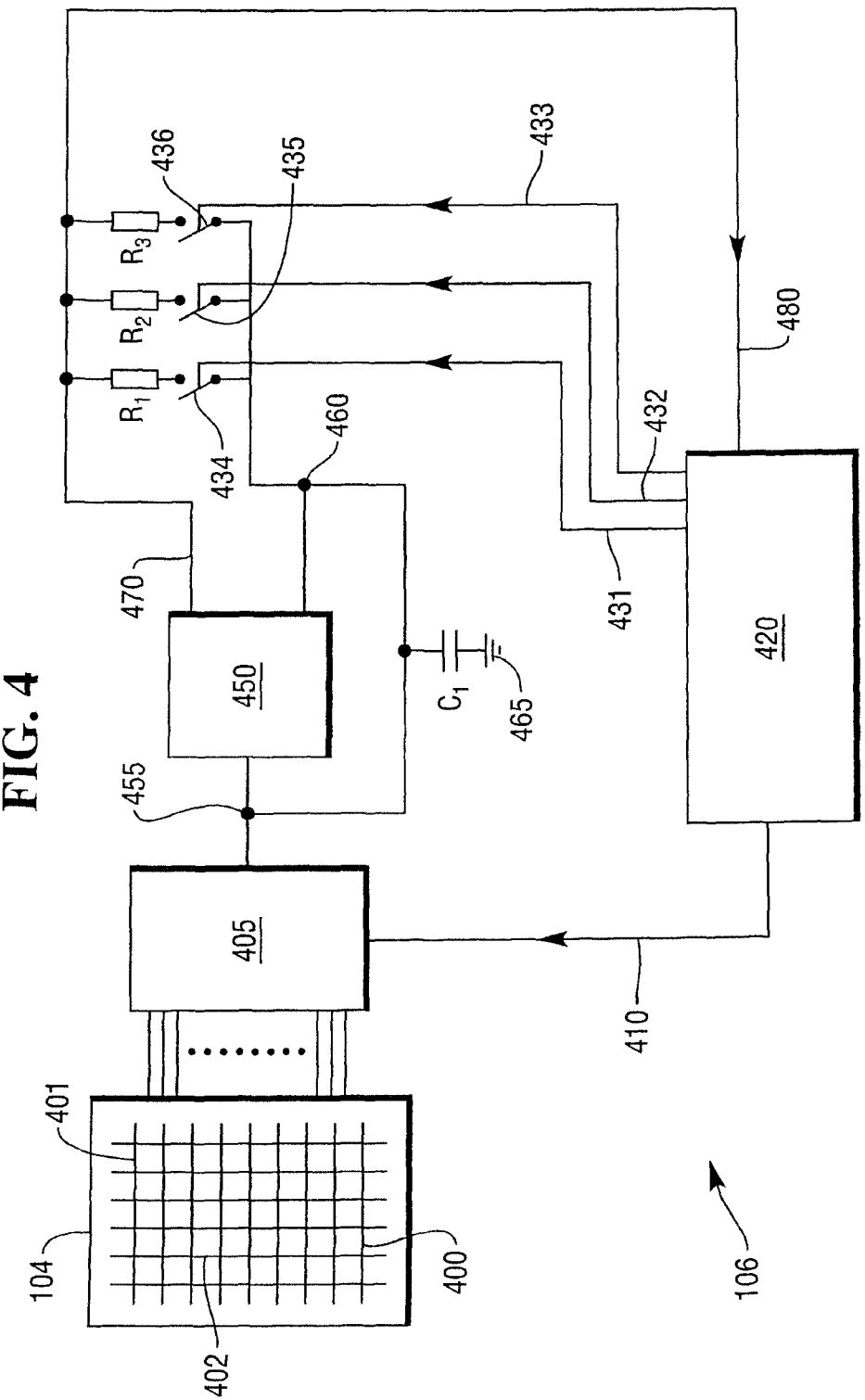
FIG. 4 illustrates a touch panel and a touch panel controller.

FIG. 4 illustrates how a touch panel 104 is connected to the touch panel controller 106 as well as illustrating parts of the touch panel controller 106. As illustrated, the touch panel 104 which is mounted over the display 102 includes a network of conductive electrodes 400. As illustrated in FIG. 4, these electrodes may be laid out in a cross-hatched pattern. It will be understood that many electrode patterns can be utilized to create a projected capacitive sensor. For example, another optional pattern for the electrodes is a series of diamonds interconnected with narrow "neck" sections. The electrodes themselves are the active conductive elements of a sensor. Aptly, the electrodes are made of indium tin oxide (ITO) which is particularly suitable because of its transparent and conductive properties. The touch panel 104 thus includes a top glass layer followed by an optically clear adhesive layer with a first ITO trace 401 arranged in a first direction. This is separated from a further ITO trace 402 arranged in a substantially orthogonal direction by a sensor glass layer. An optional clear adhesive layer is then provided over the second ITO trace which may then be utilized to secure the touch panel over a display. Optionally, the display is provided by an LCD array and suitable drive circuitry. The touch panel thus provides an array of scan and return lines in the form of a matrix covering the display itself. The touch panel controller 106 enables a scan signal to be applied to the scan lines and to examine each return line in turn to measure any change in frequency of an initial scan signal waveform. To this end, a scan/return multiplexor 405 is utilized. This receives a scan/return circuit select signal via connection 410 from a control block module 420. The module 420 also generates control signals output on control lines 431, 432, 433 which activate respective analogue switches 434, 435, 436 to selectively connect one or more resistors $R_1$, $R_2$, $R_3$ to an oscillator 450. Aptly, the oscillator is provided by a 555 timer IC chip arranged in astable mode. The oscillator thus provides a continuous stream of rectangular pulses having a specified frequency. Signals connected to the oscillator circuitry 450 via the multiplexor 405 act as a trigger signal on a node 455. This node is connected to a threshold pin of the oscillator circuitry via a node 460 and to ground 465 via a capacitor $C_1$. The frequency of the pulse stream on the output 470 is connected to the control block module 420 via connection 480. Thus, the oscillator circuitry 450 generates a waveform having a fundamental frequency and the output signal frequency can be varied by selectively connecting one or more of the resistive elements R to the output under control of the control block module. Whichever scan frequency is utilized, which is determined by which of the resistors R are connected at any one time, determines an expected frequency on the output. This is because when no touch is evident on the touch panel, then the resistance and capacitance of the conductive electrodes is known. When one or more touches occur on the screen, a different RC load is noted and this is manifested as a change in waveform period which is determined by the control block module 420. Thus, when someone touches the screen, the capacitance of the person will be coupled into the system such that it will alter the capacitance of the scan/return line circuits in closest proximity to the touch. This change in capacitance will in turn alter the load to the oscillator and therefore the frequency of oscillation of the scan signal applied to the scan and return lines affected by the touch. When the frequency of a signal changes the period of the signal will also change accordingly. This change in period can be measured by the controller using a counter triggered by the rise and fall edges of the waveform. The controller can therefore measure the period of the signal seen on each return line as it sweeps through the screen array in a pre-determined sequence. By comparison of the results from the whole array, the controller determines which return lines have a signal with a different frequency to that of the fundamental scan frequency utilized at that time. Since the scan and return lines form a matrix on the screen, the controller can then pinpoint an area being touched or areas being touched by identifying the lines with an altered frequency.

Aptly, the scan signal is a square wave of a chosen frequency generated from the RC based oscillator circuit 450. The oscillator circuit has a fixed fundamental frequency based on the combination of resistance and capacitance in the system presented as the load. For example, each scan/return line circuit will have a specific resistance and capacitance seen as the load to the oscillator circuit. As each scan/return line circuit is selected, the output from the oscillator will be applied to each circuit in turn. If the capacitance changes due to a touch, the load on the oscillator will also change resulting in a change to the frequency of oscillation. To create a second fundamental frequency which is desired when noise is detected, logic can switch a different additional load resistor into the oscillator circuit. Since the frequency of oscillation is dependent upon both capacitance and resistance in the load, any change in load resistance will also alter the frequency of oscillation. The change in RC load is made according to logic in the control block module. The controller is designed such that it can switch one, two or more resistors into the oscillator load circuit at any given time to alter the fundamental scan frequency. Additional resistors can thus be switched into the circuit in any combination, i.e. any one resistor or combinations to alter the fundamental scan frequency.

In order to isolate when one or more areas are touched on the touch panel, the control block module 420 examines each scan/return line circuit at a time by controlling the multiplexor circuit to switch in each circuit in a pre-determined sequence. Once the controller has swept through all the scan/return lines, it can compare the results measured. The frequency of the waveform measured on the scan/return line affected by a touch will be different from the known fundamental scan frequency. Since the form of the touchscreen matrix is known, the controller pinpoints the area or areas on the screen being touched.

When noise in the form of a frequency modulated wave is introduced intentionally and/or unintentionally, this couples onto the scan/return lines of the touchscreen. If the noise is at or near the fundamental scan frequency being utilized at that moment in time, when the controller examines the scan/return lines for a touch, it may interpret the noise signal as that of a valid touch. Since all the scan/return lines will be susceptible to the noise injected into the system in this way, it can be determined that too many scan/return lines exhibit characteristics of a valid touch and a determination can be made that a noise level is beyond a pre-determined threshold. The control block module thus selects a new scan frequency for the scan signal by switching one or more of the switches 434, 435, 436 to vary the frequency provided by the oscillator. It will be appreciated that other techniques for determining when an intentional or accidental noise level has occurred with the determination being utilized to trigger the selection of a new scan frequency. As noted above, optionally when noise is coupled into the system, it will generally be seen on all of the scan/return lines of the touchscreen to varying degrees depending on the coupling mechanism. If the touchscreen controller detects too many scan/return lines exhibiting characteristics associated with valid touches, then an assumption can be taken that there must be noise in the system.

Certain embodiments of the present invention thus provide much greater noise immunity and allow a projected capacitive touchscreen product to meet required standards. When noise having a noise frequency is introduced in a test mode or when environmental noise occurs proximate to a device comprising the touchscreen, a scan frequency can be selectively changed to a frequency outside the influence of the noise frequency. Thus, the device can remain operational when any noise is detected in the system or when the detected noise is of a sufficient magnitude for switching to be advantageous.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. An apparatus for providing a scan signal to a plurality of electrode elements of a touch panel, comprising:
    a capacitive sensing module that selectively provides the scan signal at a first selected single scan frequency, the scan signal provided as a continuous stream of pulses at the first selected single scan frequency, the capacitive sensing module including oscillator circuitry that generates an oscillating scan signal at a fundamental frequency;
    a plurality of resistor and/or capacitor elements that are each selectively connectable to the oscillator circuitry to provide a respective signal having a respective scan frequency; and
    a noise detection module that determines if a noise level at the first selected single scan frequency satisfies a pre-determined condition; and
    wherein:
    the capacitive sensing module provides the scan signal at a second single scan frequency when the noise level on the first selected single scan frequency satisfies the pre-determined condition, and the pre-determined condition is satisfied when too many scan/return lines that exhibit characteristics of valid touches are detected that exceed a particular threshold value necessitating a change to a different single scan frequency; and
    the capacitive sensing module and noise detection module operate, respectively, to selectively provide the scan signals and determine noise levels while the apparatus is in a non-test, operational state.

2. The apparatus as claimed in claim 1, wherein the oscillating scan signal is a square wave signal.

3. The apparatus as claimed in claim 1, further comprising:
    a touch panel comprising a plurality of conductive elements; and
    multiplexer circuitry that selectively connects the scan signal to the conductive elements in a pre-determined order.

4. The apparatus as claimed in claim 1, further comprising:
    the noise detection module determines if more than a pre-determined number of touch instances are indicated to thereby indicate that a further scan frequency is to be selected.

5. An automated teller machine (ATM) comprising the apparatus as claimed in claim 1.

6. A method of providing a scan signal to a plurality of electrode elements of a touch panel while the touch panel is in a non-test, operational state, the method comprising:

providing a scan signal at a first selected single of a plurality of possible scan frequencies to a plurality of electrode elements of a touch panel, the scan signal provided as a continuous stream of pulses at the first selected single scan frequency;

determining if a noise level at the first selected single scan frequency satisfies a pre-determined condition;

providing a scan signal at a second single scan frequency to the plurality of electrode elements when the detected noise level on the first selected single scan frequency satisfies a pre-determined condition and the pre-determined condition is satisfied when too many scan/return lines that exhibit characteristics of valid touches are detected that exceed a particular threshold value necessitating a change to a different single scan frequency;

generating a scan signal having a fundamental frequency; and selectively connecting an RC component to oscillator circuitry to vary the fundamental frequency of the scan signal.

7. The method as claimed in claim 6, further comprising determining a number of touch instances on the touch panel; and if said number is greater than a pre-determined number, determining that the noise level satisfies a pre-determined condition.

8. The method as claimed in claim 7, further comprising:

determining a touch instance by determining a change in period of a detected signal of a plurality of the electrode elements in a region of the touch panel.

9. The method as claimed in claim 6, further comprising:

selectively connecting the scan signal to the electrode element in a pre-determined order.

* * * * *